UNITED STATES PATENT OFFICE.

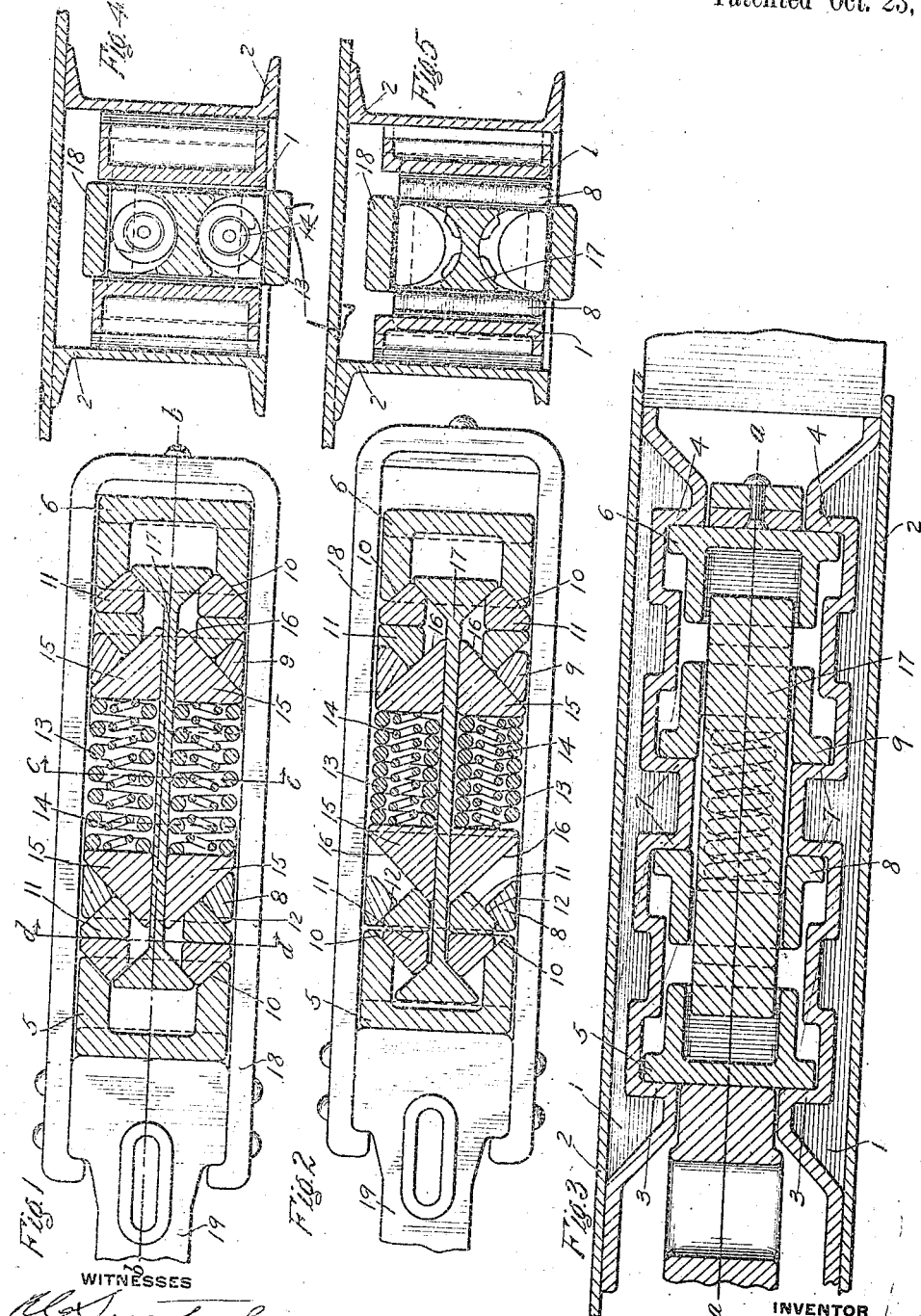

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,243,756.  Specification of Letters Patent.  Patented Oct. 23, 1917.

Application filed April 17, 1914. Serial No. 832,427.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gears, of which the following is a specification.

This invention relates to friction draft gear as employed on railway vehicles for minimizing the effect of shocks due to buffing and draft stresses.

A large number of railway cars in service are equipped with what is known as the tandem spring draft gear, but such gears are now considered inadequate due to the constantly increasing introduction of heavier cars and loads and the hauling of longer trains, which has correspondingly increased the severity of shocks which the draft gear should take care of.

It is therefore desirable to equip these cars with a draft gear adapted to withstand such service.

One of the main objects of my invention is to provide a friction draft gear which may be readily applied to cars equipped with the tandem spring gear at a minimum expense and with slight change in the existing draft gear.

In the accompanying drawing: Figure 1 is a vertical section on the line *a—a* of Fig. 3 of a friction draft gear embodying my invention, showing the parts in normal release position; Fig. 2, a similar section, showing the parts in position after the application of a buffing stress; Fig. 3 a horizontal section of the friction draft gear on the line *b—b* of Fig. 1; Fig. 4 a transverse section on the line *c—c* of Fig. 1; and Fig. 5 a transverse section on the line *d—d* of Fig. 1.

As shown in Fig. 3 of the drawing, the usual side plates 1 for a tandem spring gear are secured to the car center sills 2, each side plate having outer stops 3 and 4 and inside or intermediate stops 7.

According to my invention, in place of the usual outside follower plates, friction members 5 and 6 are employed, each having oppositely inclined friction faces 10 adapted to engage corresponding friction faces of wedge blocks 11. Said wedge blocks are preferably made up of two half sections and have other inclined friction faces adapted to engage inclined friction faces 12 of inner friction members 8 and 9 which bear against the inside stops 7.

In the present construction, twin pairs of draft springs 13 and 14 are disposed centrally of the draft gear and the opposite ends of the springs bear against wedge blocks 15 having oppositely inclined friction faces 16 adapted to engage similar friction faces on the inner friction members 8 and 9 and also friction faces provided on the wedge blocks 11.

In order to assist in holding the friction members in position when in operation, a central tie member 17 may be provided having enlarged ends with oppositely inclined faces adapted to engage similar faces on the wedge blocks 11.

A yoke 18 incloses the draft gear and is secured to the draw-bar 19 in the usual manner.

In operation, the friction members at one end are in action under buffing stresses, while the friction members at the opposite end act under draft stresses. In buffing, the draw bar 19 moves inwardly with the yoke 18, carrying with it the front follower 5.

The inward movement of the front follower causes the adjacent wedge blocks 11 to move laterally toward each other and also longitudinally to the rear, as shown in Fig. 2, since the front inner friction member 8 is held stationary by the front inner stops 7. This movement of the wedge blocks 11 forces the wedge blocks 15 rearwardly against the resistance of the draft springs 13 and 14, the remote ends of the springs being held against movement by the rear follower 6 acting through the adjacent wedge blocks 11, the rear inner friction member 9 and the rear wedge blocks 15.

In addition to the frictional resistance set up by the relative movement of the friction elements on the co-acting friction faces, the wedge blocks 15 have a frictional movement on the tie member 17 which increases the frictional resistance to movement.

In release, the pressure on the draw-bar 19 is relieved, and the draft springs 13 and 14 return the parts to normal position, as shown in Fig. 1.

The action in draft is the same as in buffing, except that the friction elements at the rear act to produce frictional resistance instead of the friction elements at the forward end of the draft gear.

The friction draft gear herein described may be installed in connection with the usual side plates of the tandem spring gear, and provides a high degree of resistance to movement.

Having now described my invention, what I claim as new and desire to secure by Letters Patent is:—

1. In a friction draft gear, the combination with a draw-bar, of draft springs, movable wedge blocks having oppositely inclined friction faces and adapted to engage said springs, an inner friction member having oppositely inclined friction faces, a follower remote from the draft springs and engaging the draw-bar and having oppositely inclined friction faces, and wedge blocks having friction faces adapted to engage friction faces of the inner friction member, the follower, and the movable wedge blocks.

2. In a friction draft gear, the combination with a draw-bar, of draft springs having at the opposite ends thereof the following elements: movable members engaging said springs and having oppositely inclined friction faces, an inside friction member and a follower, each having oppositely inclined friction faces, and wedge blocks mounted between said follower and said inside friction member and having oppositely inclined friction faces adapted to engage the friction faces of the follower, the inside friction member, and said movable members.

3. In a friction draft gear, the combination with a draw-bar, of side plates secured to the car center sills and provided with outside stops and intermediate stops, of followers engaging the outside stops, inner friction members engaging the intermediate stops, the followers and inner friction members having oppositely inclined friction faces, movable wedge blocks having oppositely inclined friction faces engaging friction faces of the followers and the inner friction members, movable wedge members engaging the movable wedge blocks, and draft springs interposed between the movable wedge members.

4. In a friction draft gear, the combination with a draw-bar, of side plates secured to the car center sills and provided with outside stops and intermediate stops, followers engaging the outside stops and provided with oppositely inclined friction faces, draft springs mounted between the intermediate stops, friction members engaging opposite ends of the draft springs and provided with oppositely inclined friction faces, wedge blocks interposed between and having friction faces for engaging the friction faces of the followers and the friction members, and an inside friction member engaging the intermediate stops at opposite sides and having friction faces for engaging corresponding friction faces of the wedge blocks.

In testimony whereof I have hereunto set my hand.

EDWARD W. NEWELL.

Witnesses:
S. W. KEEFER,
BARBARA HERBERT.